United States Patent
Andersen

(10) Patent No.: US 11,815,065 B2
(45) Date of Patent: Nov. 14, 2023

(54) METHOD AND SYSTEM FOR DETECTING A WIND GUST THAT AFFECTS A WIND TURBINE

(71) Applicant: Siemens Gamesa Renewable Energy A/S, Brande (DK)

(72) Inventor: Martin Folmer Andersen, København (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 63 days.

(21) Appl. No.: 17/608,491

(22) PCT Filed: Apr. 15, 2020

(86) PCT No.: PCT/EP2020/060540
§ 371 (c)(1),
(2) Date: Nov. 3, 2021

(87) PCT Pub. No.: WO2020/229075
PCT Pub. Date: Nov. 19, 2020

(65) Prior Publication Data
US 2022/0213873 A1 Jul. 7, 2022

(30) Foreign Application Priority Data
May 16, 2019 (EP) .................................. 19174863

(51) Int. Cl.
*F03D 17/00* (2016.01)
*F03D 7/02* (2006.01)

(52) U.S. Cl.
CPC .......... *F03D 17/00* (2016.05); *F03D 7/0224* (2013.01); *F05B 2260/80* (2013.01);
(Continued)

(58) Field of Classification Search
CPC .... F03D 17/00; F03D 7/0224; F05B 2260/80; F05B 2270/322; F05B 2270/33; F05B 2270/331
See application file for complete search history.

(56) References Cited

U.S. PATENT DOCUMENTS

| | | | |
|---|---|---|---|
| 7,942,634 B2 * | 5/2011 | Christensen | F03D 7/046 416/37 |
| 11,143,165 B2 * | 10/2021 | Caponetti | F03D 17/00 |

(Continued)

FOREIGN PATENT DOCUMENTS

| | | | | |
|---|---|---|---|---|
| CN | 107810397 B * | 6/2021 | | F03D 17/00 |
| EP | 2484904 A2 * | 8/2012 | | F03D 1/008 |

(Continued)

OTHER PUBLICATIONS

PCT International Search Report & Written Opinion dated Jul. 2, 2020 corresponding to PCT International Application No. PCT/EP2020/060540.

(Continued)

*Primary Examiner* — Pedro J Cuevas
(74) *Attorney, Agent, or Firm* — Schmeiser, Olsen & Watts LLP

(57) ABSTRACT

Provided is a method for detecting a wind gust that affects a wind turbine, wherein the wind turbine includes two or more blades which are coupled to a connection means so that the blades are essentially arranged in a common plane. The method including: i) measuring an event that at least one blade is at least partially out of the plane to obtain a measurement signal, ii) providing the measurement signal as a measurement input signal to an evaluation algorithm, iii) elaborating a detection result from the measurement input signal using the evaluation algorithm, and iv) comparing the detection result with a predefined wind gust threshold value (h) to determine, if a wind gust is detected. Furthermore, a (Continued)

wind gust detection system, a wind turbine that includes the system, and a wind turbine operating method are provided.

13 Claims, 3 Drawing Sheets

(52) U.S. Cl.
CPC ..... *F05B 2270/322* (2013.01); *F05B 2270/33* (2013.01); *F05B 2270/331* (2013.01)

(56) References Cited

U.S. PATENT DOCUMENTS

| | | | | |
|---|---|---|---|---|
| 11,448,194 | B2* | 9/2022 | Lucks | F03D 13/35 |
| 11,493,911 | B2* | 11/2022 | Srinivasan | H02J 3/00 |
| 2009/0266160 | A1* | 10/2009 | Jeffrey | F03D 17/00 |
| | | | | 73/455 |
| 2010/0117361 | A1* | 5/2010 | Christensen | F03D 7/0224 |
| | | | | 290/44 |
| 2018/0156200 | A1* | 6/2018 | Caponetti | F03D 17/00 |
| 2020/0209841 | A1* | 7/2020 | Srinivasan | G05B 13/02 |
| 2021/0040939 | A1* | 2/2021 | Lucks | F03D 17/00 |
| 2023/0152794 | A1* | 5/2023 | Srinivasan | G05B 23/0283 |
| | | | | 700/286 |

FOREIGN PATENT DOCUMENTS

| | | | | |
|---|---|---|---|---|
| EP | 2 795 109 | A1 | 10/2014 | |
| EP | 3314226 | B1* | 8/2021 | F03D 17/00 |
| EP | 3974645 | A1* | 3/2022 | F03D 13/35 |
| WO | WO 2013/091638 | | 6/2013 | |
| WO | WO 2018/184645 | A1 | 10/2018 | |
| WO | WO-2019129373 | A1* | 7/2019 | F03D 13/35 |

OTHER PUBLICATIONS

Stoyan Kanev et al: "Wind Turbine Extreme Gust Control Recognition and Control of extreme operation gusts and wind direction changes", ECN Report ECN-E-08-069, Jan. 1, 2008 (Jan. 1, 2008).

* cited by examiner

US 11,815,065 B2

METHOD AND SYSTEM FOR DETECTING A WIND GUST THAT AFFECTS A WIND TURBINE

CROSS-REFERENCE TO RELATED APPLICATIONS

This application claims priority to PCT Application No. PCT/EP2020/060540, having a filing date of Apr. 15, 2020, which claims priority to EP Application No. 19174863.1, having a filing date of May 16, 2019, the entire contents both of which are hereby incorporated by reference.

FIELD OF TECHNOLOGY

The following relates to the detection of a wind gust that affects a wind turbine. The present invention relates further to a wind gust detection system. Additionally, the following relates to a wind turbine that comprises the wind gust detection system. Furthermore, the following relates to a method of operating the wind turbine.

BACKGROUND

It may be considered as the common practice to establish wind turbines within especially windy environment, e.g., off-shore, in order to yield an efficient power production. However, sudden and/or strong winds such as wind gusts can cause severe and extreme loads to the blades and/or the tower of a wind turbine. Therefore, a functionality in a wind turbine, which can compensate for fast changes in the wind and/or loading may be considered as necessary.

However, a major challenge is to distinguish between small changes in normal production with turbulences and large changes in wind gust events. This is in particular the case, because compensation is generally unwanted during normal power production, as this, e.g., in case of pitch action (for compensation of wind gusts), would lead to a loss of the annual energy production (AEP) and increase damages to components (e.g., the pitch bearings) of a wind turbine.

Therefore, it may be considered crucial that the control system of a wind turbine has a functionality which clearly can distinguish wind gusts from normal turbulences and make the decision whether to perform a compensation action of a wind gust or not.

According to an example from the conventional art shown in FIG. 4, wind gust detection has previously been done by using wind speed measurements (shown in FIG. 4 as a simulation). The abscissa shows the measured wind speed in m/s, while the ordinate shows the time in seconds. The presence of a wind gust may be detected by a sudden increase of the wind speed (in this example at around 25 seconds). However, the quality of these measurements is questionable as the result may only represent a local point measurement of the wind speed rather than the wind speed change across the whole rotor disk area.

There may be a need for providing a method for detecting a wind gust in a robust, fast, and reliable manner.

SUMMARY

An aspect relates to a method for detecting a wind gust that affects a wind turbine, wherein the wind turbine comprises two or more blades (in particular three blades) which are coupled (connected) to a connection means (e.g., a hub) so that the blades are essentially arranged in a common plane (e.g., the rotor disk). The method comprises: i) measuring (e.g., by using a sensor, in particular a blade sensor) an event that at least one blade is at least partially out of the plane (e.g., measuring a blade flap moment and/or a blade edge moment and calculating an out-of-plane moment from the measured blade flap and/or blade edge moment), thereby obtaining a measurement signal (for example a blade flap moment in kNm over time), ii) providing (for example performing a processing such as filtering or performing a calculation) the measurement signal as a measurement input signal (e.g., a processed signal and/or a calculated signal based on the measured signal) to an evaluation algorithm (for example a detection algorithm that uses a likelihood estimation approach), iii) elaborating a detection result from the measurement input signal using the evaluation algorithm, and iv) comparing the detection result with a predefined wind gust threshold value (e.g., determining if the detection result exceeds the threshold value) to determine, if a wind gust is detected (or if no wind gust is detected).

According to a further aspect of embodiments of the invention, a wind gust detection system is described for a wind turbine, wherein the wind turbine comprises two or more blades which are coupled to a connection means so that the blades are essentially arranged in a common plane. The system comprises: i) a measurement unit (in particular a blade root moment sensor), configured to measure an event that at least one blade is at least partially out of the plane to obtain a measurement signal, and ii) an evaluation unit that comprises an evaluation algorithm, wherein the evaluation unit is configured to a) provide the measurement signal as a measurement input signal to the evaluation algorithm, b) elaborate a detection result from the measurement input signal using the evaluation algorithm, and c) compare the detection result with a predefined wind gust threshold value to determine, if a wind gust is detected.

According to a further aspect of embodiments of the invention, a wind turbine is described. The wind turbine comprises: i) a tower, ii) a connection means coupled to the tower, iii) two or more blades which are arranged at the connection means essentially in a common plane with respect to each other, and iv) the wind gust detection system as described above.

According to a further aspect of embodiments of the invention, a method of operating a wind turbine (in particular the wind turbine as described above) is described. The method comprises: i) detecting a wind gust that affects the wind turbine according to the method described above; and, upon detecting the presence of a wind gust, ii) initiating a wind gust reaction (and upon not detecting the presence of a wind gust, not initiating a wind gust reaction).

In the context of the present document, the term "measurement signal" may refer to a signal that is based on a measurement. The term "measurement signal" can hence refer to a measured blade flap or blade edge moment. However, the term "measurement signal" may also refer to a calculated signal (value) that is based on (or derived from) actual measurement signal (values). For example, a measurement signal may be an out-of-plane moment which has been calculated based on a measured blade flap and/or blade edge moment.

In the context of the present document, the term "measurement input signal" may refer to a signal that is derived from (or based on) a measurement and is suitable to be used as an input signal (for example to an evaluation algorithm). The measurement input signal may be based on a measured signal (or a plurality of measured signals). However, the measurement input signal may have been processed and/or a calculation may have been done based on the measured signal. For example, a blade flap moment and/or a blade edge moment may be measured and then, an out-of-plane moment from the measured blade flap and/or blade edge moment may be calculated. Afterwards, the out-of-plane moments of several blades may be averaged and further processed (e.g., filtered) in order to provide a measurement input signal.

According to an exemplary embodiment, the invention may be based on the idea that a robust, fast, and reliable method for detecting a wind gust may be provided, when combining the measurements of blade flap and edge moments (e.g., as a rate of change) of the wind turbine blades with an evaluation algorithm (e.g., a likelihood estimation algorithm) for (change) detection. Conventionally, only wind speeds were taken into account when to detecting wind gusts. However, the described method proposes to take into account specific measurement results from the wind turbine blades (e.g., flaps) as an input for an evaluation algorithm which elaborates a determination (detection) result that can be compared with a threshold value for determining the presence of a wind gust. For example, when the detection result (values) exceeds the predefined threshold value, a wind gust is detected. The threshold value may thereby be used to separate wind gust events from normal operation events.

Hereby, the rate of change increases earlier when looking at blade loads compared to looking at the rotor speed. The rotor speed is affected later, when a wind gust arrives (due to delay/phase lag). Therefore, the rotor speed has a very late indication of wind gusts (which, however, occur suddenly), while the blade flap movements (i.e., a blade moves out of the common plane) can indicate the presence of sudden wind gusts much earlier. Hereby, the early detection may be an important advantage because a compensation reaction to the wind gust may be initiated earlier. Consequently, the compensation may be more efficient and robust, and the lifetime of wind turbine components may be expanded.

According to an embodiment of the invention, the evaluation algorithm comprises a statistical estimation, in particular a likelihood estimation. More in particular, the evaluation algorithm comprises a generalized likelihood ratio (GLR) algorithm. This may provide the advantage that an efficient and established evaluation method can be directly implemented.

A plurality of statistical estimation algorithms have been established that can be applied in order to elaborate a detection result from the measurement input signal. One example may apply a likelihood (ratio) estimation, wherein an unknown parameter is replaced by its maximum likelihood estimate. In an example, it is assumed that the measurement input signal has a Gaussian distribution. In a preferred embodiment, the evaluation algorithm may be implemented based on the generalized likelihood ratio (GLR) algorithm. In another example, the evaluation algorithm may be implemented using a CUSUM algorithm.

According to an embodiment of the invention, the method further comprises: providing a reference mean value and a reference standard deviation value, together with the measurement input signal, to the evaluation algorithm.

The evaluation algorithm may be designed to detect unknown changes in the (reference) mean value of a given signal (e.g., the measurement input signal). In an example, the evaluation algorithm has additionally the reference (expected) mean value and a standard deviation value as an input. In an implementation, these values are variable in order to adapt to different operating points, i.e., a running mean value and a standard deviation value over a fixed period of time. This may provide the advantage that the elaboration of a detection result is especially efficient and robust.

According to an embodiment of the invention, each blade comprises a root region, wherein each blade is connected with its respective root region to the connection means, and measuring further comprises: performing the measurement in the environment of at least one of the blade root regions. In particular the measurement is done using a blade root moment sensor. This may provide the advantage that, without additional efforts, a fast and robust measurement can be performed that leads (after evaluation) to the detection of a wind gust.

A wind turbine comprises in general a plurality of sensors. Many wind turbines also comprise sensors in the blades in order to detect wind parameters. Some of these blade sensors may be configured to measure the event that a blade moves at least partially out of the common plane (as defined above) and to send these measurement results to a wind turbine control system. In this manner, so called out-of plane/flap moments may be detected anyway and can be directly used for the described method. Hence, without the efforts of installing additional sensors, the already present blade sensors (in particular the blade root region sensors) can be directly applied.

A blade of a wind turbine may be divided into three main areas classified by aerodynamic and structural function: i) the root region, ii) the mid-span region, and iii) the tip region. At the root region, the presence of wind gusts may be indicated earlier than on other regions of the blade (or the rotor), because the rate of change at the last may be very small. For an efficient compensation of the wind gust, it may be crucial to detect the wind gust as early as possible.

According to an embodiment of the invention, the wind turbine comprises a tower and the method further comprises: observing an event that a high load acts on the tower bottom (in particular the tower bottom is at least partially out of a tower bottom plane) and using the observation to support the detection of the wind gust. This may provide the advantage that, without additional effort, the presence of a wind gust can be confirmed and/or additional evaluation data can be taken into account.

The bottom of a wind turbine may be strongly affected by wind gusts. In an example, a moment of around 200.000 kNm may act on the tower bottom and may accordingly move the tower. Such movements of the tower bottom out of a tower bottom plane may be used to detect a wind gust. However, the reaction time is very large in this case. In an example, a wind gust may be detected around 10 seconds earlier by blade out-of-plane moments than by tower bottom (movement) moments. Therefore, considering the tower bottom moments, may be an appropriate means to confirm the presence of a detected wind gust. In another example, the tower bottom moment may be provided as well to the evaluation algorithm for detection of a wind gust.

According to an embodiment of the invention, the method further comprises measuring the event that a blade is at least partially out of the plane for all blades (in particular three blades) of the wind turbine to obtain a plurality of measurement signals. This may provide the advantage that a more accurate measurement signal is provided, taking into account all available measurement data.

According to an embodiment of the invention, providing the measurement input signal further comprises averaging the plurality of measurement signals. This may provide the advantage that all relevant measurement signal sets can be efficiently combined into one average measurement input signal value. Furthermore, an average signal may be a more reliable measurement signal than a single measurement signal because it may be desired to represent the loading of the whole rotor disc instead of a single blade.

According to an embodiment of the invention, providing the measurement input signal further comprises: filtering the measurement signal (in particular the average measurement signal) to obtain a filtered measurement signal. Filtering could be done for example using a low pass filter. This may provide the advantage that the signal quality can be improved in a straightforward manner.

According to an embodiment of the invention, the measuring further comprises performing a rate of change calculation of the event that at least one blade is at least partially out of the plane. Calculating the change rate instead of using a single value may make the detection of a wind gust event more accurate.

According to an exemplary embodiment, a wind gust reaction may comprise performing any action with respect to a wind turbine that is only performed, when a wind gust has been detected (as described above). In an example, the reaction may comprise activating an alarm signal. Alternatively, or additionally, a wind gust compensation action may be performed. The term "compensation action" may describe any action that at least to some extend compensates the effect of a wind gust. For example, a pitching action of at least one blade may be initiated.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. The embodiments will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein.

DETAILED DESCRIPTION

Figure 1:
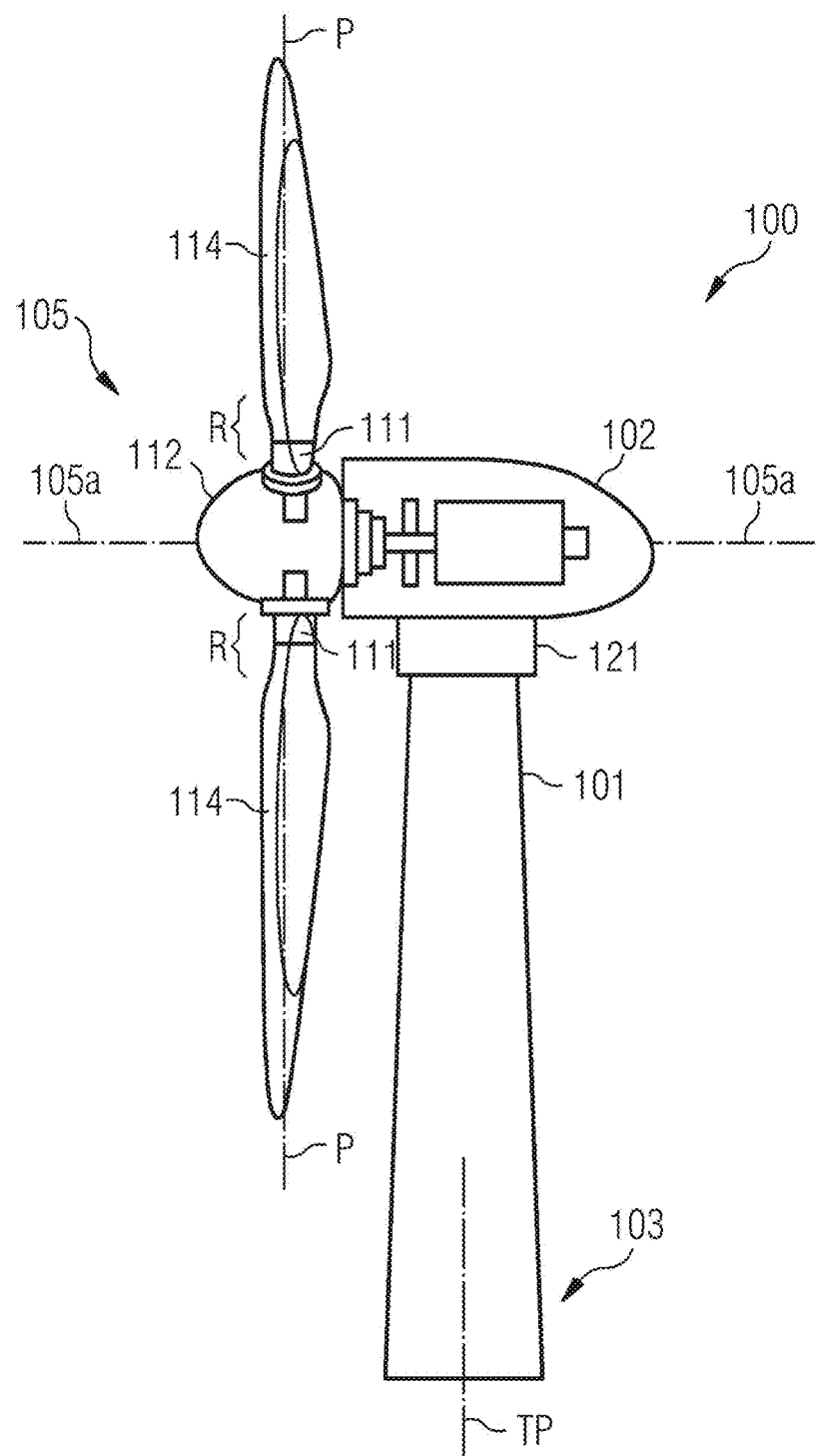
FIG. 1 shows a wind turbine according to an embodiment of the invention.

According to an exemplary embodiment, the described method utilizes the measurement of blade root flap moments and/or blade edge moments (as measurement signals), as these show an early indication of a wind gusts rather than a rotor speed measurement, which, due to rotor inertia, has a delayed response. For an efficient compensation, it is crucial that the wind gust is detected as soon as possible. In several implementations, the control system of a wind turbine already includes a function which calculates blade out-of-plane moments for each of the blades. The out-of-plane-moments can be processed (e.g., averaged and filtered) to avoid sensitivity to noise before calculating the derivative. This obtained processed signal is then used to detect the wind gust.

According to an exemplary embodiment, the only thing that needs to be measured are the blade flap and/or blade edge moments. Based on these measurements, the following calculation/processing steps are performed:
  i) the measurement signals of blade flap- and edge moments get transformed (through calculations) into out-of-plane moments,
  ii) the out-of-plane moments (of all blades) get averaged, and
  iii) filtered,
  iv) the rate of change gets calculated.

According to an exemplary embodiment, as the wind speed increases, the blade flap- and tower bottom loading increases. This gives changes in the input signal to a GLR algorithm (as an evaluation algorithm) and thereby increases the likelihood ratio detection result). When the likelihood ratio exceeds the threshold value (see e.g., at 21 seconds in FIG. 8 below), the wind gust alarm switches from 0 to 1 indicating that a wind gust is present.

According to an exemplary embodiment, combining the blade root sensors gives a more accurate input signal for gust detection. Making the reference mean and standard deviation of the input signal variable is also not the standard implementation of the GLR. However, this can be necessary in order to make the described method robust to different operating points with different level of turbulence. Assuming that the wind gust detection is used in combination with a pitch-contribution to mitigate the wind gust, the tuning of the gain and/or threshold in the pitch-contribution would be easier, as the gust-detector would dictate, when a pitch contribution is allowed. Without a wind gust detection system, a pitch-contribution would have to include a variable gain and/or threshold depending on the operating point, i.e., a significant number of tunable parameters.

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously, though, all such spatially relative terms refer to the orientation shown in the figures for ease of description and are not necessarily limiting as an apparatus according to an embodiment of the invention can assume orientations different than those illustrated in the figures when in use.

FIG. 1 shows a wind turbine 100 according to an embodiment of the invention. The wind turbine 100 comprises a tower 101, which is mounted with a tower bottom 103 (that is oriented along a tower bottom plane TP) on a non-depicted fundament. On top of the tower 101 there is arranged a nacelle 102. In between the tower 101 and the nacelle 102 there is provided a yaw angle adjustment system 121, which is capable of rotating the nacelle 102 around a non-depicted vertical axis, which is aligned with the longitudinal extension of the tower 101. The wind turbine 100 according to the embodiment described here further comprises a rotor 105 having three blades 114. In the perspective of FIG. 1 only two blades 114 are visible. The rotor 105 is rotatable around a rotational axis 105a. The blades 114 are mounted at a connection means 112, also called driving collar or hub, and extend radial with respect to the rotational axis 105a.

Hereby, the blades 114 are connected to the hub 112 so that the three blades 114 are, with respect to each other, arranged in a common plane P. Each blade 114 comprises a root region R with a blade root moment sensor 111, wherein the root region R is arranged closer to the hub 112 than other regions (e.g., middle region, tip region) of the respective blade 114.

Not specifically depicted in FIG. 1, the wind turbine 100 comprises a wind gust detection system that comprises the blade root moment sensors 111 and an evaluation unit.

Figure 2:
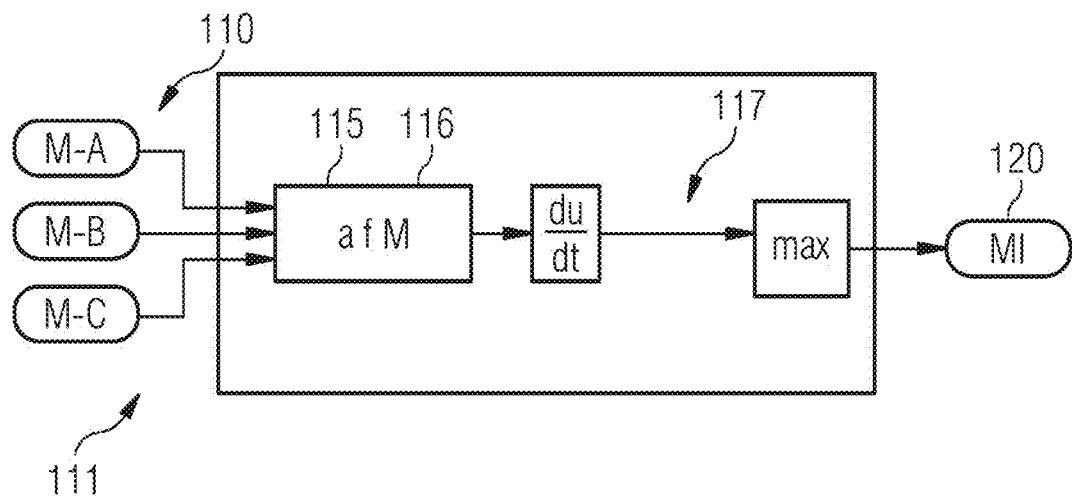
FIG. 2 shows measuring a measurement signal and providing a measurement input signal according to an embodiment of the invention.

FIG. 2 shows measuring (see reference sign 110) of a measurement signal (blade flap and/or blade edge moment), deriving (calculating) an out-of-plane moment signal M-A from the measured signal and providing a (processed) measurement input signal MI according to an embodiment of the invention. The measurement 110 is performed in the environment of each blade root region R (see FIG. 1 above) by using the specific blade root moment sensors 111. Hereby, the rate of change of the respective event that one blade is at least partially out of the common plane P (blade flap moment) is measured for each blade 114 individually. These measurements yield three measurement (derived) signals M-A, M-B, and M-C, one for each blade 114 of the three blade wind turbine 100. These three measurement (derived) signals M-A, M-B, M-C are then averaged (see reference sign 115) to an average measurement signal aM. This average measurement signal aM is filtered (see reference sign 116) by a low-pass filter to obtain a filtered average measurement signal afM. For this filtered average measurement (based) signal, a rate of change can be calculated so that it can be handled as a measurement input signal MI and is then sent to an evaluation algorithm 131.

Figure 3:
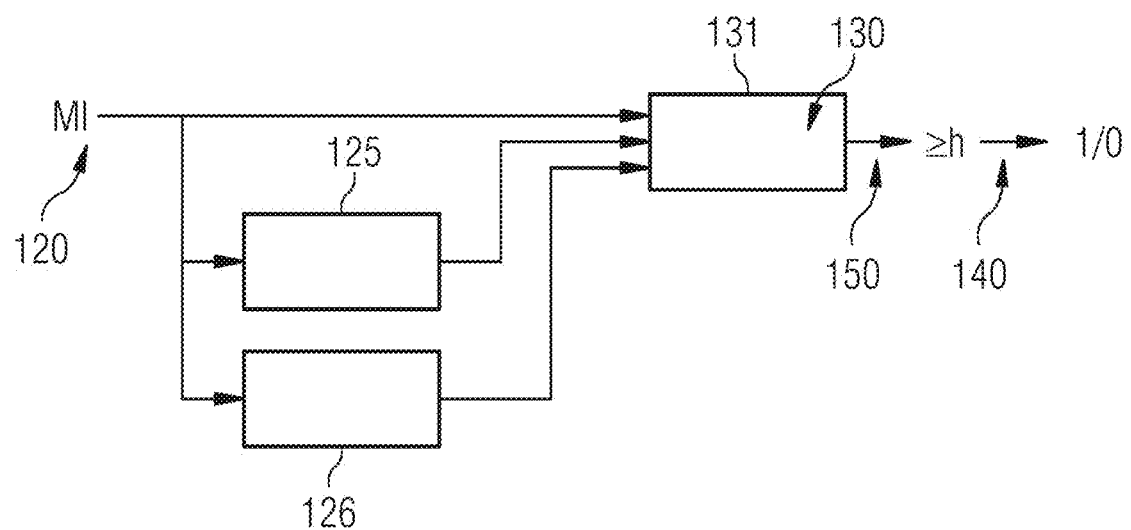
FIG. 3 shows an evaluation and a determination according to an embodiment of the invention.

FIG. 3 shows elaborating (see reference sign 130) and determining (see reference sign 140) according to an embodiment of the invention. In this described example, a generalized likelihood ratio (GLR) algorithm is used as the evaluation algorithm 131. However, many other implementations are possible, for example using another likelihood estimation algorithm, e.g., a CUSUM algorithm. The measurement (based) input signal MI is provided to the evaluation algorithm 130 together with a reference mean value 125 and a reference standard value 126. Based on these input values MI, 125, 126, the evaluation algorithm 131 elaborates 130 a detection result (values) 150. This detection result 150 is then compared with a predefined threshold value h. In case that the detection result 150 is larger than or equal to h, it can be concluded/determined that a wind gust has been detected. In case that the detection result 150 is smaller than h, it will be concluded that no wind gust has been detected.

FIGS. 5 to 9 show examples of embodiments of the invention using a simulation.

Figure 5:
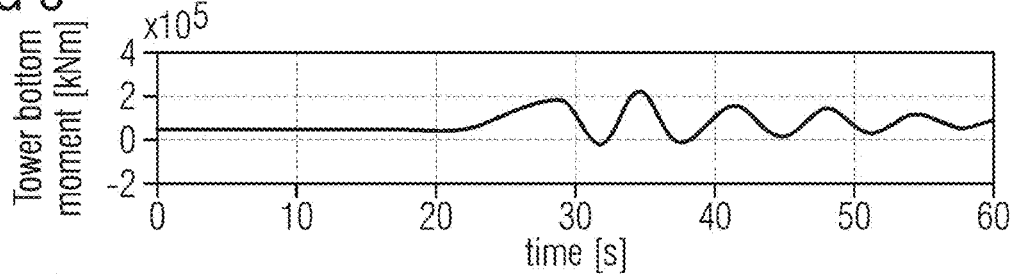
FIG. 5 shows a simulation of a tower bottom moment caused by a wind gust.

FIG. 5 illustrates the development of a tower bottom moment in kNm (abscissa) over time in seconds (ordinate), when a wind gust affects the wind turbine 100. A load of around 200.000 kNm acts on the tower bottom and this moment can be clearly observed. However, as will be seen in FIG. 6, the effect of the wind gust at the tower bottom 103 is observed around ten seconds after the wind gust effect is detected at the root region R of a wind turbine blade 114.

Figure 6:
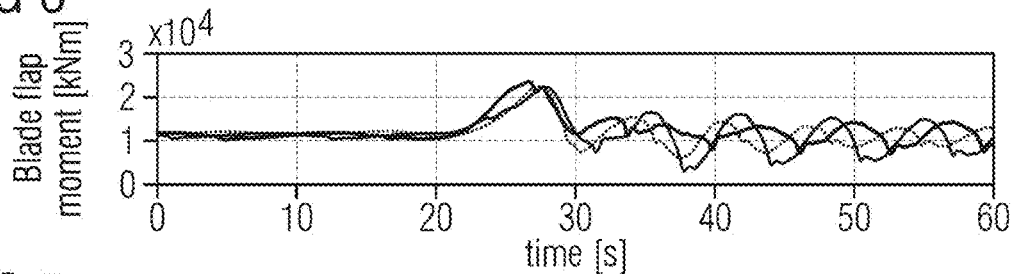
FIG. 6 shows a simulation of the measured values of the blade flap moments of each blade according to an embodiment of the invention.

FIG. 6 illustrates the measured blade flap moments development of the three measurement signals M-A, M-B, and M-C, each resulting from one of the three blades 114 of the wind turbine 100, for example detected by blade root moment sensors 111, over time. The event that the blades are moving out of the common plane P (blade flap moment) is shown in kNm (abscissa) over time (ordinate), when a wind gust affects the wind turbine 100. Even though that each blade 114 is affected differently, the effect of the wind gust can be measured from each blade 114. In comparison to the tower bottom movement (see FIG. 5 above), the wind gust can be detected much earlier using the blade root moment sensors 111. Based on these measured blade flap moments, the three measurement (based) signals M-A, M-B, and M-C (which represent the out-of-plane moments) can be calculated.

Figure 7:
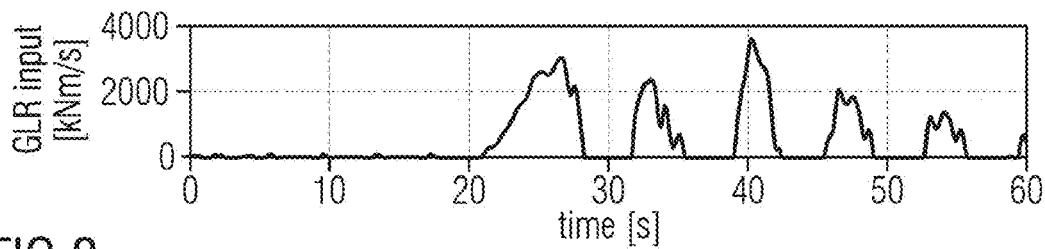
FIG. 7 shows a simulation of the measurement input signal which is input to the evaluation algorithm according to an embodiment of the invention.

FIG. 7 illustrates the measurement (based) input signal MI represented in kNm/s. This signal has been obtained as described above by processing (averaging, filtering, calculating the rate of change) of the measurement (based) signals M-A, M-B, M-C from FIG. 6 above.

Figure 8:
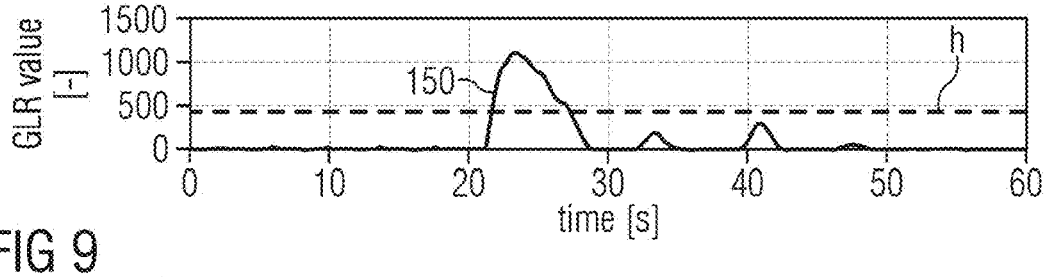
FIG. 8 shows detection results according to exemplary embodiments of the invention.

FIG. 8 illustrates the detection result (values over time) 150 (in arbitrary units) that has been elaborated 130 by the evaluation algorithm 131 to which the measurement input signal MI, the reference mean value 125 and the reference standard deviation 126 have been provided as an input. The dotted line represents the predefined threshold value h. In case that a GLR algorithm is used, the detection result would be represented as a log-likelihood ratio.

Figure 4:
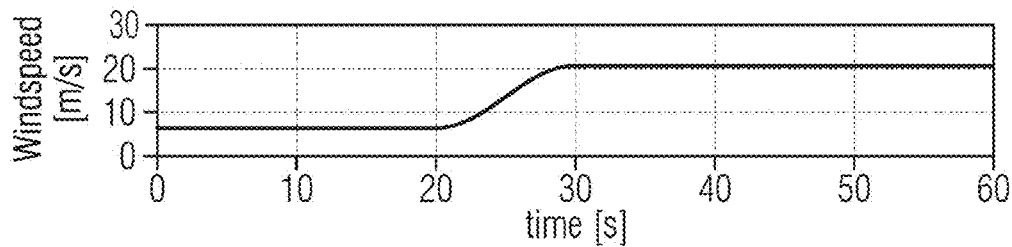
FIG. 4 shows an example of a wind speed measurement (shown as a simulation) to detect a wind gust according to the conventional art.
Figure 9:
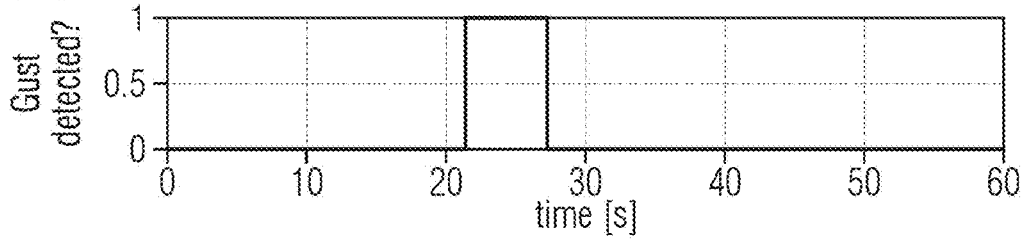
FIG. 9 shows detection results according to exemplary embodiments of the invention.

FIG. 9 shows the final wind gust detection result after the detection result 150 has been compared with the predefined threshold value h. Indicated is the time window, wherein the detection result 150 is larger than the predefined threshold value h. Thus, the final wind gust detection result is, that a wind gust affected the wind turbine 100 in the time window between 21 and 28 seconds. This determination is much faster than a detection based on tower bottom movements (only) and much more efficient and reliable than the conventional art approach of measuring the wind speed (see FIG. 4 above).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for detecting a wind gust that affects a wind turbine, wherein the wind turbine comprises two or more blades which are coupled to a connection means so that the blades are essentially arranged in a common plane, the method comprising:
   measuring an event that at least one blade is at least partially out of the common plane, thereby obtaining a measurement signal;
   providing the measurement signal as a measurement input signal to an evaluation algorithm wherein the evaluation algorithm comprises a likelihood estimation;
   providing a reference mean value and a reference standard deviation value, together with the measurement input signal, to the evaluation algorithm;
   elaborating a detection result from the measurement input signal, the reference mean value, and the reference standard deviation value using the evaluation algorithm; and
   comparing the detection result with a predefined wind gust threshold value to determine if a wind gust is detected.

2. The method according to claim 1, wherein the evaluation algorithm comprises a generalized likelihood ratio.

3. The method according to claim 1, wherein each blade of the two or more blades comprise a root region, wherein each blade is coupled at a respective root region to the connection means, and wherein the measuring further comprises:
   performing the measurement in an environment of at least one of the blade root regions by using a blade root moment sensor.

4. The method according to claim 1, wherein the wind turbine comprises a tower, and wherein the method further comprises:
   observing an event that a high load acts on a tower bottom, wherein the tower bottom is at least partially out of a tower bottom plane; and
   using the observation to support the detection of the wind gust.

5. The method according to claim 1, further comprising:
   measuring the event that a blade is at least partially out of the common plane for all blades of the wind turbine, thereby obtaining a plurality of measurement signals.

6. The method according to claim 5, wherein providing the measurement input signal further comprises:
   averaging the plurality of measurement signals to obtain an average measurement signal.

7. The method according to claim 6, wherein providing the measurement input signal further comprises:
   filtering an average measurement signal to obtain a filtered measurement signal.

8. The method according to claim 7, wherein the measuring further comprises:
   performing a rate-of-change calculation of the filtered measurement signal of the event that at least one blade is at least partially out of the common plane.

9. A method of operating a wind turbine, the method comprising:
   detecting a wind gust that affects the wind turbine according to the method according to claim 1; and, upon detecting the presence of a wind gust,
   initiating a wind gust reaction.

10. A wind gust detection system for a wind turbine, wherein the wind turbine comprises two or more blades which are coupled to a connection means so that the blades are essentially arranged in a common plane, the system comprising:
    a measurement unit configured to
    measure an event that at least one blade is at least partially out of the common plane, thereby obtaining a measurement signal; and
    an evaluation unit that comprises an evaluation algorithm, the evaluation algorithm comprising a likelihood estimation, wherein the evaluation unit is configured to:
    provide the measurement signal as a measurement input signal to the evaluation algorithm,
    provide a reference mean value and a reference standard deviation value, together with the measurement input signal, to the evaluation algorithm,
    elaborate a detection result from the measurement input signal, the reference mean value, and the reference standard deviation value using the evaluation algorithm, and
    compare the detection result with a predefined wind gust threshold value to determine if a wind gust is detected.

11. A wind turbine, comprising:
    a tower;
    a connection means coupled to the tower;
    two or more blades which are arranged at the connection means essentially in a common plane with respect to each other; and
    the wind gust detection system according to claim 10.

12. The wind turbine according to claim 11, wherein the wind turbine is a direct drive wind turbine or a gearbox wind turbine.

13. The wind gust detection system of claim 10, wherein the measurement unit is a blade root moment sensor.

* * * * *